(12) United States Patent
Vu et al.

(10) Patent No.: US 7,181,188 B2
(45) Date of Patent: Feb. 20, 2007

(54) METHOD AND APPARATUS FOR ENTERING A LOW POWER MODE

(75) Inventors: Mieu Van Vu, Austin, TX (US); Christopher K. Chun, Austin, TX (US); Arthur M. Goldberg, Parkland, FL (US); David J. Hayes, Lake Worth, FL (US); Charbel Khawand, Miami, FL (US); Jianping Tao, Cedar Park, TX (US); John J. Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 164 days.

(21) Appl. No.: 10/806,498

(22) Filed: Mar. 23, 2004

(65) Prior Publication Data

US 2005/0215227 A1    Sep. 29, 2005

(51) Int. Cl.
  *H04B 1/16* (2006.01)
(52) U.S. Cl. .............. 455/343.2; 455/343.5; 455/574; 713/322
(58) Field of Classification Search ............. 455/334, 455/343.1–343.5, 127.1, 127.5, 550.1, 572, 455/574; 713/320, 321, 322
  See application file for complete search history.

(56) References Cited

U.S. PATENT DOCUMENTS

| | | | |
|---|---|---|---|
| 5,487,181 A | 1/1996 | Dailey | |
| 5,903,746 A | 5/1999 | Swoboda | |
| 5,954,819 A * | 9/1999 | Kenny et al. | 713/322 |
| 5,983,355 A | 11/1999 | Kenny | |
| 5,983,356 A | 11/1999 | Pandey | |
| 6,002,436 A | 12/1999 | Anderson | |
| 6,725,067 B1 * | 4/2004 | Marx et al. | 455/574 |
| 6,804,503 B2 * | 10/2004 | Shohara et al. | 455/343.4 |
| 2002/0006812 A1 | 1/2002 | Saadeh et al. | |
| 2003/0032463 A1 * | 2/2003 | Cannon et al. | 455/574 |
| 2003/0172310 A1 * | 9/2003 | Moyer et al. | 713/300 |
| 2003/0172313 A1 * | 9/2003 | Jain et al. | 713/300 |
| 2004/0029620 A1 * | 2/2004 | Karaoguz | 455/574 |
| 2004/0203389 A1 * | 10/2004 | Kojima et al. | 455/41.2 |
| 2004/0248624 A1 * | 12/2004 | Leclercq | 455/574 |

FOREIGN PATENT DOCUMENTS

WO    WO99/11053    3/1999

* cited by examiner

*Primary Examiner*—Edward F. Urban
*Assistant Examiner*—Nhan T. Le
(74) *Attorney, Agent, or Firm*—Susan C. Hill

(57) ABSTRACT

A method and apparatus for entering a low power mode is provided. In one embodiment, data processing system (10) has power control circuitry (52) which may be used to control power usage in data processing system (10). Power mode select circuitry (84) may be used to select a power mode. Depending upon the power mode selected, power control circuitry (52) may use a cascaded approach to selecting which portions of data processing system (10) will be powered down, and thus how deeply data processing system (10) will be powered down.

21 Claims, 4 Drawing Sheets

METHOD AND APPARATUS FOR ENTERING A LOW POWER MODE

FIELD OF THE INVENTION

The present invention generally relates to a low power mode, and more particularly, to a method and apparatus for entering a low power mode.

RELATED ART

For a wide variety of applications, it is becoming more and more important to reduce the power consumed by electrical circuitry. For example, reducing power consumption may be very important for hand held devices which rely on a battery as a source of power. Also, it may be very important to reduce power consumption in order to reduce the heat generated by the electrical circuitry, such as, for example, the heat generated by a central processing unit in a computer. There are many other such applications in which it is desirable to reduce the power consumed by electrical circuitry.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
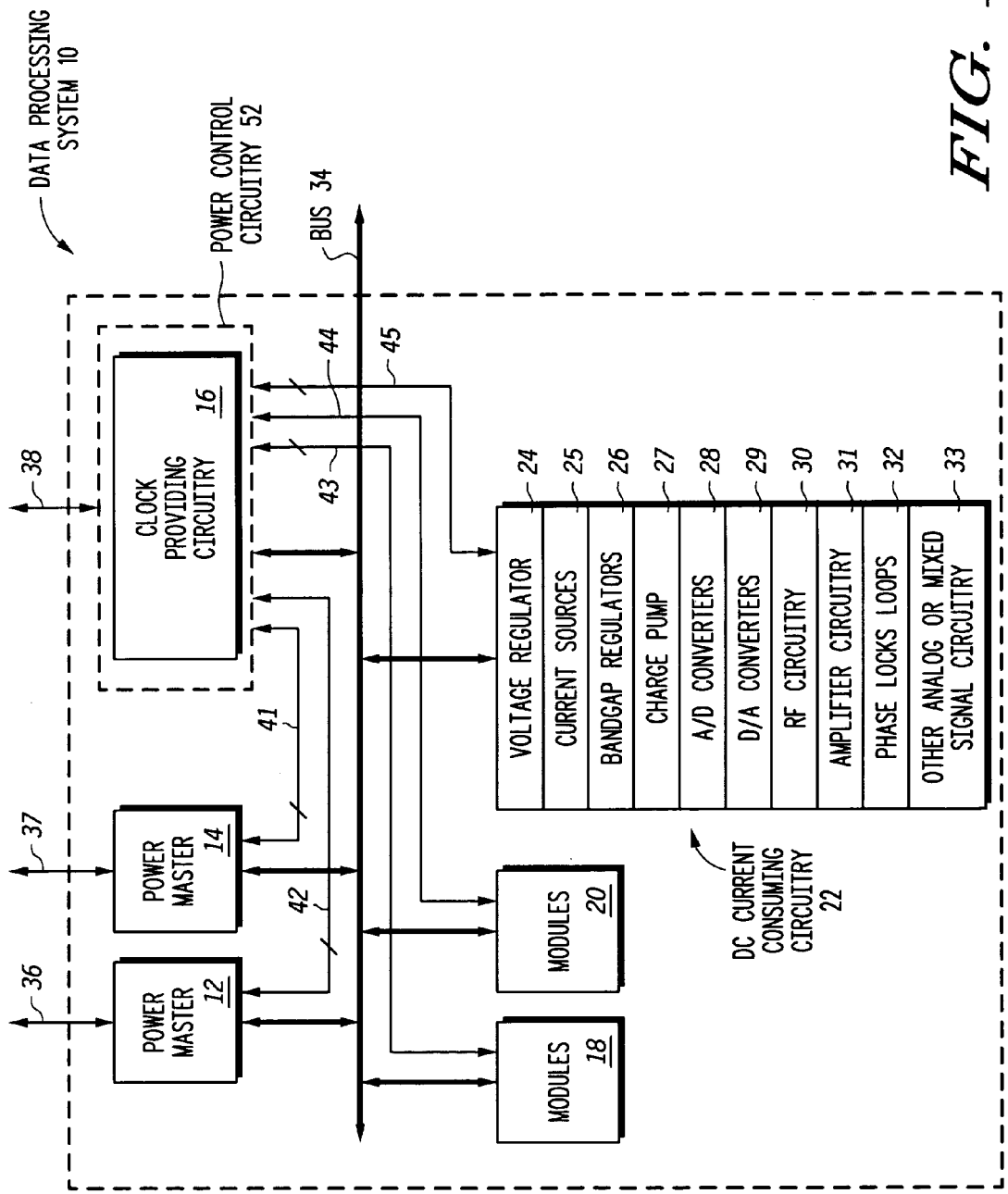
FIG. 1 illustrates, in block diagram form, a data processing system in accordance with one embodiment of the present invention.

FIG. 1 illustrates, in block diagram form, a data processing system in accordance with one embodiment of the present invention. In one embodiment, data processing system 10 includes power master 12, power master 14, clock providing circuitry 16, modules 18, modules 20, and DC current consuming circuitry 22, all of which are bi-directionally coupled to bus 34. In alternate embodiments, bus 34 may or may not be provided external to data processing system 10. In some embodiments of the present invention, clock providing circuitry 16 may be included as a portion of power control circuitry 52. Power control circuitry 52 is bi-directionally coupled to power master 14 by way of signals 41; power control circuitry 52 is bi-directionally coupled to power master 12 by way of signals 42; power control circuitry 52 is bi-directionally coupled to modules 18 by way of signals 43; power control circuitry 52 is bi-directionally coupled to modules 20 by way of signals 44; and power control circuitry 52 is bi-directionally coupled to DC current consuming circuitry 22 by way of signals 45. In one embodiment, DC current consuming circuitry 22 includes voltage regulator 24, current sources 25, bandgap regulators 26, charge pump 27, A/D converters 28, D/A converters 29, RF circuitry 30, amplifier circuitry 31, phase lock loops 32, and other analog or mixed signal circuitry 33. Alternate embodiments may include more, fewer, or different portions within DC current consuming circuitry 22. In some embodiments of the present invention, power master 12 may be coupled external to data processing system 10 by way of terminals 36; in some embodiments of the present invention, power master 14 may be coupled external to data processing system 10 by way of terminals 37; and in some embodiments of the present invention, clock providing circuitry 16 may be coupled external to data processing system 10 by way of terminals 38. In alternate embodiments of the present invention (not shown), modules 18 and 20 and DC current consuming circuitry 22 may also be coupled external to data processing system 10.

In some embodiments of the present invention, power master 12 provides a trigger signal (one of signals 42) to power control circuitry 52 approximately at the same time or before at least a portion of the clocks of power master 12 have been stopped or gated off. In one embodiment of the present invention, power master 12 provides a trigger signal (one of signals 42) to power control circuitry 52 before all of the clocks of power master 12 have been stopped or gated off. Alternate embodiments of the present invention may stop or gate off any subset of the clocks provided to power master 12 after power master 12 provides a trigger signal (one of signals 42) to power control circuitry 52.

Similarly, power master 14 may provides a trigger signal (one of signals 41) to power control circuitry 52 approximately at the same time or before at least a portion of the clocks of power master 14 have been stopped or gated off. In one embodiment of the present invention, power master 14 provides a trigger signal (one of signals 41) to power control circuitry 52 before all of the clocks of power master 14 have been stopped or gated off. Alternate embodiments of the present invention may stop or gate off any subset of the clocks provided to power master 14 after power master 14 provides a trigger signal (one of signals 41) to power control circuitry 52. Note that all or a portion of the clocks of power masters 12 and 14 may be interrelated, or all clocks of power masters 12 and 14 may be independent.

Once power control circuitry 52 receives the trigger signal from power master 12, it determines which signals of signal 42 provided to power master 12, and which signals (one or more of signals 43–45) provided to one or more of modules 18, modules 20, and DC current consuming circuitry 22 should be affected in order to reduce the power consumed. For example, the power consumed by a module may be reduced by stopping or gating off all or a portion of the clocks used in the module. As another example, the power consumed by a module may be reduced by turning off one or more circuits that consume DC current. Note that it may be useful to both stop the clocks as well as turning off one or more circuits that consume DC current in the same module (e.g. any one of 18, 20, 22).

Modules 18 may include one or more modules. Similarly, modules 20 may include one or more modules. Some examples of a module are a display controller, a graphics controller, a camera sensor interface, a video encoder, a video decoder, an universal serial bus (USB), a direct memory access controller (DMAC), a cache controller, an any other type of circuitry which performs a desired function in a data processing system 10.

In alternate embodiments of the present invention, power control circuitry 52 may provide one or more additional power management functions to data processing system 10, such as dynamic voltage/frequency scaling, well biasing, reduced voltage, state retention power gating, power gating, or any other desired power management function. These additional power management functions may be separate from or in addition to the stopping/gating of clocks and the shutting off of DC current consuming circuitry.

Figure 2:
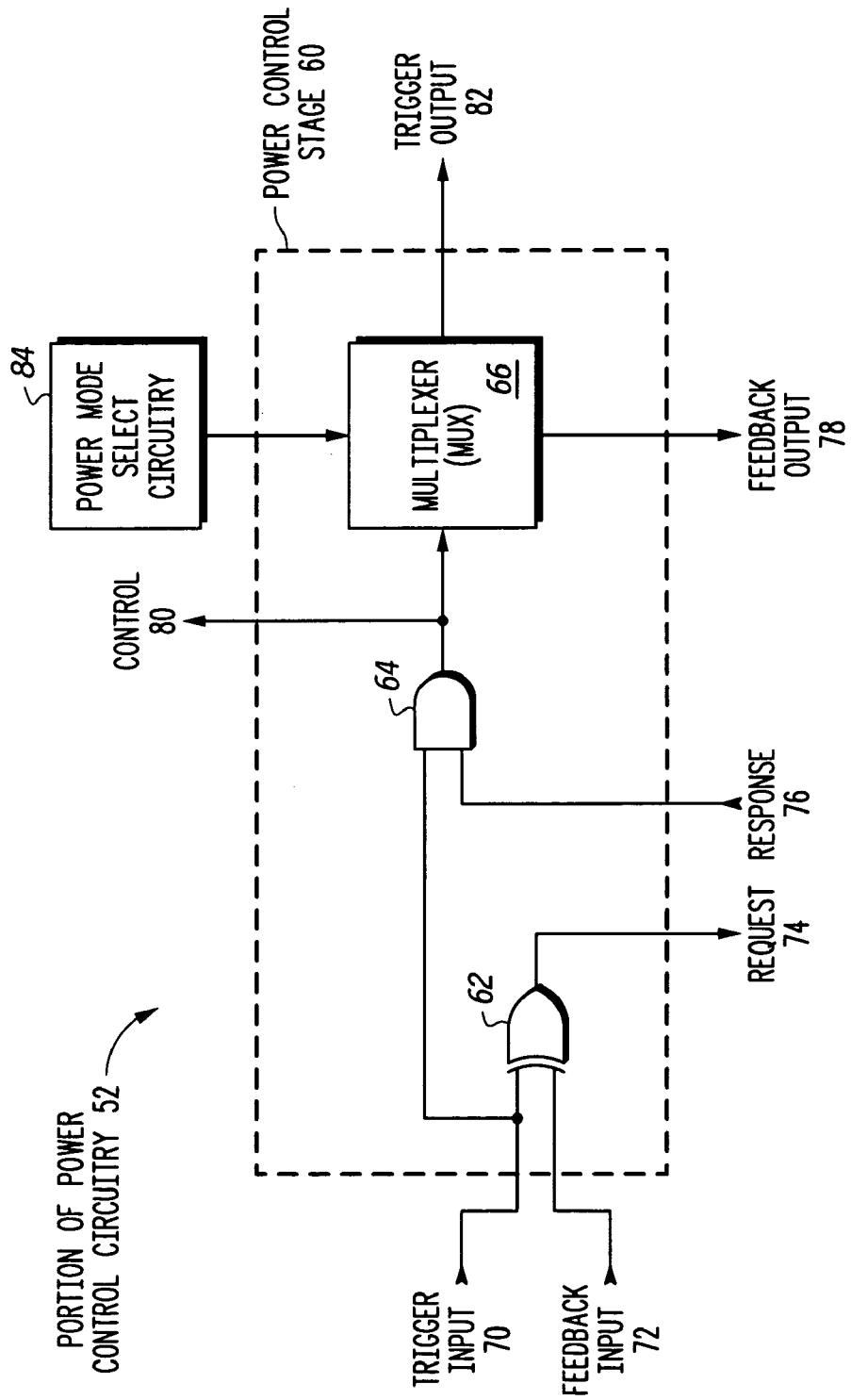
FIG. 2 illustrates, in partial block diagram form and partial schematic diagram form, a portion of power control circuitry 52 of FIG. 1 in accordance with one embodiment of the present invention.

FIG. 2 illustrates a portion of power control circuitry 52 of FIG. 1 in accordance with one embodiment of the present invention. Although the illustrated embodiment uses particular logic gates (e.g. XOR gate 62 and AND gate 64), alternate embodiments of the present invention may implement the functionality of power control stage 60 using any desired circuitry. The circuitry illustrated in FIG. 2 is just one example.

In one embodiment, FIG. 2 illustrates an XOR gate 62 which receives trigger input 70 at a first input and which receives feedback input 72 at a second input. The output of XOR gate 62 provides a request 74 signal. An AND gate 64 receives trigger input 70 at a first input and receives response 76 at a second input. The output of AND gate 64 provides a control 80 signal which is provided external to power control stage 60 and which is also provided to multiplexer (MUX) 66 as an input. MUX 66 also receives an input from power mode select circuitry 84. MUX 66 provides a trigger output 82 and a feedback output 78. In one embodiment, power control stage 60 includes XOR gate 62, AND gate 64, and MUX 66. Alternate embodiments of the present invention may implement power control stage 60 in any desired manner.

In one embodiment of the present invention, power mode select circuitry 84 provides a control input to MUX 66 which is related to the power mode that has been selected in circuitry 84. In one embodiment of the present invention, power mode select circuitry 84 includes a user programmable register that can be written to select one of a plurality of low power modes. Alternate embodiments of the present invention may have any number of low power modes. The low power modes can be defined in any desired way. For example, (1) a wait mode in which at least a portion of the clocks in power master 12 are stopped/gated off; (2) a stop mode in which at least a portion of the clocks in power master 12, as well as clocks to one or more selected modules 18, 20 are stopped/gated off; and (3) a deep sleep mode in which at least a portion of the clocks in power master 12, as well as clocks to a plurality modules 18, 20 are stopped/gated off, and also at least one DC current consuming circuit (24–33) is shut off. Alternate embodiments of the present invention may define wait mode, stop mode, and deep sleep mode in a different way. Also, alternate embodiments of the present invention may use fewer, more, or different low power modes.

Initially the feedback input signal 72 is negated, thus the assertion of trigger input signal 70 causes request signal 74 to be asserted. Request 74 may then be provided to one of modules 18, modules, 20, or DC current consuming circuitry 22. The same one of modules 18, modules, 20, or DC current consuming circuitry 22 then responds back with a response signal 76 which indicates that the modules 18, 20 or circuitry 22 have taken whatever actions, if any, are required to prepare for low power mode. Once response 76 is asserted, the output of AND gate 64, control signal 80, is asserted. Note that trigger input 70 has remained asserted. Power mode select circuitry 84 then routes the asserted control signal 80 to one of two possible output paths, namely feedback output signal 78 or trigger output signal 82. If the low power mode selected by power mode select circuitry 84 requires that additional circuitry, beyond what is affected by control signals 80, be put into a lower power mode (e.g. shut off), then the trigger output signal 82 is asserted so that an additional power control stage may be triggered. However, if the low power mode selected by power mode select circuitry 84 does not require that additional circuitry, beyond what is affected by control signals 80 as well as previous power stages, be put into a lower power mode (e.g. shut off), then the feedback output signal 78 is asserted so that no additional power control stages are triggered.

Once the feedback input 72 is asserted, request 74 is negated. In response to the negation of request 74, the corresponding one of modules 18, 20, or DC current consuming circuitry 22 enables negating of response 76. The output of AND gate 64 is then negated, thus negating control signal 80. As a result, the output selected by MUX 66, namely one of trigger output 82 and feedback output 78, is then also negated.

Figure 3:
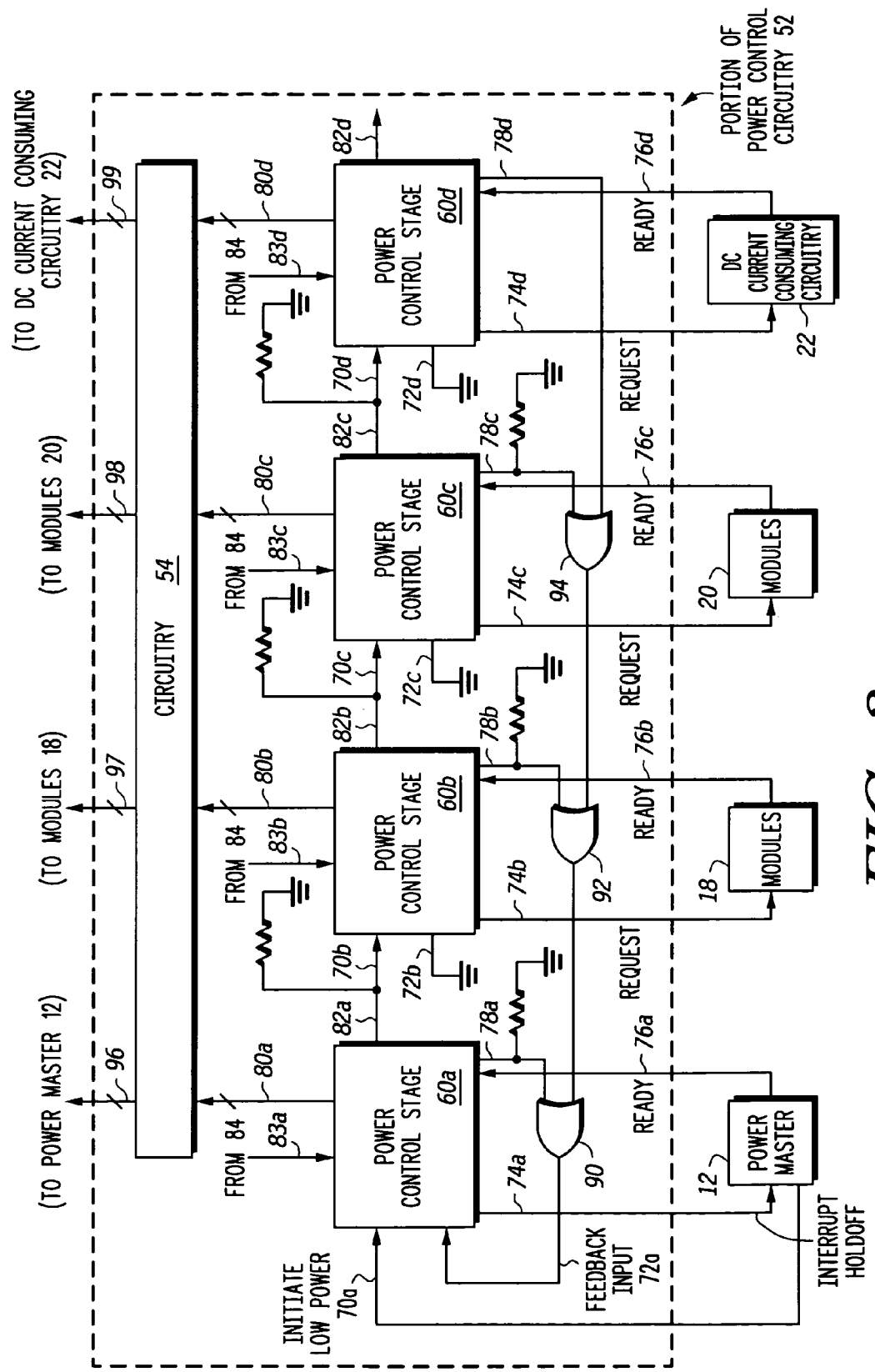
FIG. 3 illustrates, in partial block diagram form and partial schematic diagram form, a portion of power control circuitry 52, power master 12, modules 18, modules 20, and DC current consuming circuitry 22 of FIG. 1 in accordance with one embodiment of the present invention.

FIG. 3 illustrates a portion of power control circuitry 52, power master 12, modules 18, modules 20, and DC current consuming circuitry 22 of FIG. 1 in accordance with one embodiment of the present invention. Note that FIG. 3 is an example of an implementation of the present invention that uses a plurality of power control stages 60a, 60b, 60c, and 60d which have been cascaded. Alternate embodiments may implement the logic and blocks of FIG. 3 in any desired manner. Also, alternate embodiments may use any desired number of cascaded power control stages.

In one embodiment, power control circuitry 52 includes a power control stage 60a which provides an output 78a to OR gate 90, receives an input of ready signal 76a from power master 12, provides an output of interrupt holdoff signal 74a to power master 12, receives an input called initiate low power 70a from power master 12, receives an input called feedback input 72a from OR gate 90, receives an input 83a from power mode select circuitry 84, provides an output 80a to circuitry 54, and provides an output 82a to power control stage 60b.

In one embodiment, power control circuitry 52 includes a power control stage 60b which provides an output 78b to OR gate 92, receives an input of ready signal 76b from modules 18, provides an output of request signal 74b to modules 18, receives a feedback input 72b which is grounded, receives an input 70b from the output 82a of power control stage 60a, receives an input 83b from power mode select circuitry 84, provides an output 80b to circuitry 54, and provides an output 82b to power control stage 60c.

In one embodiment, power control circuitry 52 includes a power control stage 60c which provides an output 78c to OR gate 94, receives an input of ready signal 76c from modules 20, provides an output of request signal 74c to modules 20, receives a feedback input 72c which is grounded, receives an input 70*c* from the output 82*b* of power control stage 60*b*, receives an input 83*c* from power mode select circuitry 84, provides an output 80*c* to circuitry 54, and provides an output 82*c* to power control stage 60*d*.

In one embodiment, power control circuitry 52 includes a power control stage 60*d* which provides an output 78*d* to a second input of OR gate 94, receives an input of ready signal 76*d* from DC current consuming circuitry 22, provides an output of request signal 74*d* to DC current consuming circuitry 22, receives a feedback input 72*d* which is grounded, receives an input 70*d* from the output 82*c* of power control stage 60*c*, receives an input 83*d* from power mode select circuitry 84, provides an output 80*d* to circuitry 54, and provides an output 82*d*.

The output of OR gate 94 is provided as a second input to OR gate 92. The output of OR gate 92 is provided as a second input to OR gate 90. Circuitry 54 provides signals 96 to power master 12, provides signals 97 to modules 18, provides signals 98 to modules 20, and provides signals 99 to DC current consuming circuitry 22. Some inputs (e.g. 78*a*, 78*b*, 78*c*, 70*b*, 70*c*, 70*d*) may use pull-down resistors to maintain the voltage of the input at a known value when it is not being actively driven. Alternate embodiments of the present invention may not require pull-down resistors. Alternate embodiments may use different logic and blocks to implement a portion of power control circuitry 52. The logic and blocks illustrated in FIG. 3 are just one example of how a portion of power control circuitry 52 may be implemented. For at least one embodiment of the present invention, interrupt holdoff signal 74*a* illustrated in FIG. 3 may correspond to, and even be the same as, request signal 74 in FIG. 2.

In one embodiment of the present invention, power control stage 60*a* corresponds to a low power mode labeled wait mode in which at least a portion of the clocks in power master 12 are stopped/gated off. Note that the low power mode is selected by signal 83*a* provided from power mode select circuitry 84. This wait mode does not use power control stages 60*b*, 60*c*, and 60*d* and their corresponding circuitry. Thus, wait mode only uses power control stage 60*a*, power master 12, and OR gate 90, along with their associated signals. In one embodiment of the present invention, power master 12 provides an initiate low power signal 70*a* to the trigger input 70 of power control stage 60*a*. Note that in one embodiment of the present invention, the request signal 74*a* to power master 12 is utilized as an interrupt holdoff signal 74*a* which prevents the power master 12 from receiving interrupts until the transition into the low power mode has been completed. Note that for wait mode, there is really no need to holdoff interrupts, so it is not necessary to assert the interrupt holdoff signal 74*a* for a sufficient amount of time for it to have an effect on power master 12.

Still referring to power control stage 60*a*, the response signal 76*a* from power master 12 is implemented as a ready signal 76*a* which indicates that the power master 12 is ready to have one or more of its clocks stopped/gated off. In one embodiment of the present invention, the ready signal 76*a* is asserted at approximately the same time or later than the initiate low power signal 70*a*. MUX 66*a* (MUX 66 as implemented in stage 60*a*, not shown) selects the feedback output path 78*a*. The feedback path through OR gate 90 causes feedback input signal 72*a* to be asserted, thus negating the interrupt holdoff signal 74*a*. In one embodiment of the present invention, the brief time that interrupt holdoff signal 74*a* is asserted has no effect on power master 12. The output of AND gate 64*a* (not shown) is provided as signal 80*a* to circuitry 54. Circuitry 54 uses control signal 80*a* to affect signals 96 which are provided to power master 12. Signals 96 may include one or more clock signals that may be gated by circuitry 54. Signals 96 may include one or more signals that shut off one or more DC current consuming circuits (not shown) located within power master 12. Note that signals 74*a*, 76*a*, and 96 are included within signals 42 of FIG. 1.

In one embodiment of the present invention, power control stages 60*a*, 60*b*, and 60*c* correspond to a low power mode labeled stop mode in which at least a portion of the clocks in power master 12, as well as clocks to one or more selected modules 18, 20 are stopped/gated off. Note that the stop mode is selected by signals 83*a*, 83*b*, and 83*c* provided from power mode select circuitry 84. This stop mode does not use power control stage 60*d* and its corresponding circuitry. Thus, stop mode only uses power control stage 60*a*, power master 12, OR gate 90, power control stage 60*b*, modules 18, OR gate 92, power control stage 60*c*, modules 20, OR gate 94, along with their associated signals.

Note that the resistors illustrated in FIG. 3 are used to cause the signal to be pulled low when the signal is not being actively provided. Alternate embodiments of the present invention will not use resistors, but will instead drive the signals to the desired states.

Power master 12 provides an initiate low power signal 70*a* to the trigger input 70 of power control stage 60*a*. In one embodiment of the present invention, power control stage 60*a* operates in the same manner as described for wait mode, except MUX 66*a* (not shown) asserts the trigger output signal 82*a* which is provided to power control stage 60*b* as input 70*b*. MUX 66*a* (not shown) thus no longer asserts feedback output 78*a*. Note that in one embodiment of the present invention, the request signal 74*b* to modules 18 is utilized as a request signal 74*b* which requests that the modules 18 prepare for the low power mode (e.g. prepare for all clocks to module 18 to be stopped).

Still referring to power control stage 60*b*, the response signal 76*b* from modules 18 is implemented as a ready signal 76*b* which indicates that one or more of modules 18 are ready to have one or more of their clocks stopped/gated off. MUX 66*b* (MUX 66 as implemented in stage 60*b*, not shown) selects the trigger output path 82*b*. The feedback path through OR gate 92 is not asserted by feedback output signal 78*b*. The output of AND gate 64*b* (not shown) is provided as signal 80*b* to circuitry 54. Circuitry 54 uses control signal 80*b* to affect signals 97 which are provided to modules 18. Signals 97 may include one or more clock signals that may be gated by circuitry 54. Signals 97 may include one or more signals that shut off one or more DC current consuming circuits (not shown) located within modules 18. Note that signals 74*b*, 76*b*, and 97 are included within signals 43 of FIG. 1.

Trigger output 82*b* provides an asserted signal to the trigger input 70*c* of power control stage 60*c*. MUX 66*c* (not shown) does assert feedback output 78*c*. Note that in one embodiment of the present invention, the request signal 74*c* to modules 20 is utilized as a request signal 74*c* which requests that the modules 20 prepare for the low power mode (e.g. prepare for all clocks to module 20 to be stopped).

Still referring to power control stage 60*c*, the response signal 76*c* from modules 20 is implemented as a ready signal 76*c* which indicates that one or more of modules 20 are ready to have one or more of their clocks stopped/gated off. MUX 66*c* (MUX 66 as implemented in stage 60*c*, not shown) selects the trigger output path 82*c*. The feedback path through OR gate 94 is asserted by feedback output signal 78*c*. The output of AND gate 64*c* (not shown) is provided as signal 80c to circuitry 54. Circuitry 54 uses control signal 80c to affect signals 98 which are provided to modules 20. Signals 98 may include one or more clock signals that may be gated by circuitry 54. Signals 98 may include one or more signals that shut off one or more DC current consuming circuits (not shown) located within modules 20. Note that signals 74c, 76c, and 98 are included within signals 44 of FIG. 1.

MUX 66c (MUX 66 as implemented in stage 66c, not shown) selects the feedback output path 78c. The feedback path through OR gate 94 causes feedback input signal 72a to be asserted, thus negating the interrupt holdoff signal 74a.

In one embodiment of the present invention, power control stages 60a, 60b, 66c, and 60d correspond to a low power mode labeled deep sleep mode in which at least a portion of the clocks in power master 12, as well as clocks to a plurality modules 18, 20 are stopped/gated off, and also at least one DC current consuming circuit (24–33) is shut off. Note that the deep sleep mode is selected by signals 83a, 83b, 83c, and 83d provided from power mode select circuitry 84. This deep sleep mode uses all of the circuitry illustrated in FIG. 3.

Power master 12 provides an initiate low power signal 70a to the trigger input 70 of power control stage 60a. In one embodiment of the present invention, power control stage 60a, 60b, and 60c operate in the same manner as described for stop mode, except MUX 66c (not shown) asserts the trigger output signal 82c which is provided to power control stage 60d as input 70d. MUX 66c (not shown) thus no longer asserts feedback output 78c. Note that in one embodiment of the present invention, the request signal 74d to DC current consuming circuitry 22 is utilized as a request signal 74d which requests that the circuitry 22 prepare for the low power mode (e.g. prepare to be shut off).

Still referring to power control stage 60d, the response signal 76d from circuitry 22 is implemented as a ready signal 76d which indicates that one or more portions of circuitry 22 are ready to be shut off. MUX 66d (MUX 66 as implemented in stage 60d, not shown) does not select the trigger output path 82b. The feedback path through OR gate 94 is asserted by feedback output signal 78d. The output of AND gate 64d (not shown) is provided as signal 80d to circuitry 54. Circuitry 54 uses control signal 80d to affect signals 99 which are provided to circuitry 22. Signals 99 may include one or more clock signals that may be gated by circuitry 54. Signals 99 may include one or more signals that shut off one or more DC current consuming circuits 24–33 located within circuitry 22. Note that signals 74d, 76d, and 99 are included within signals 45 of FIG. 1.

MUX 66d (MUX 66 as implemented in stage 60d, not shown) selects the feedback output path 78d. The feedback path through OR gate 94 causes feedback input signal 72a to be asserted, thus negating the interrupt holdoff signal 74a.

In an alternate embodiment of the present invention, one or more stages 60b, 66c, and 60d may be bypassed by adding a small amount of routing and a MUX (not shown) controlled by power mode select circuitry 84. For example, if a selected power mode requires modules 20 to be powered down while allowing modules 18 to remain powered up, a MUX at the input to power control stage 60c will receive 82a and 82b as inputs, as well as a control input from power mode select circuitry 84 to select which one of 82a and 82b is used as the trigger input 70c. In the same manner, a MUX may be added at the trigger input 70 of any one or more of the stages to select whether the immediately preceding stage, or any one of the earlier preceding stages, provides the signal to trigger input 70.

Figure 4:
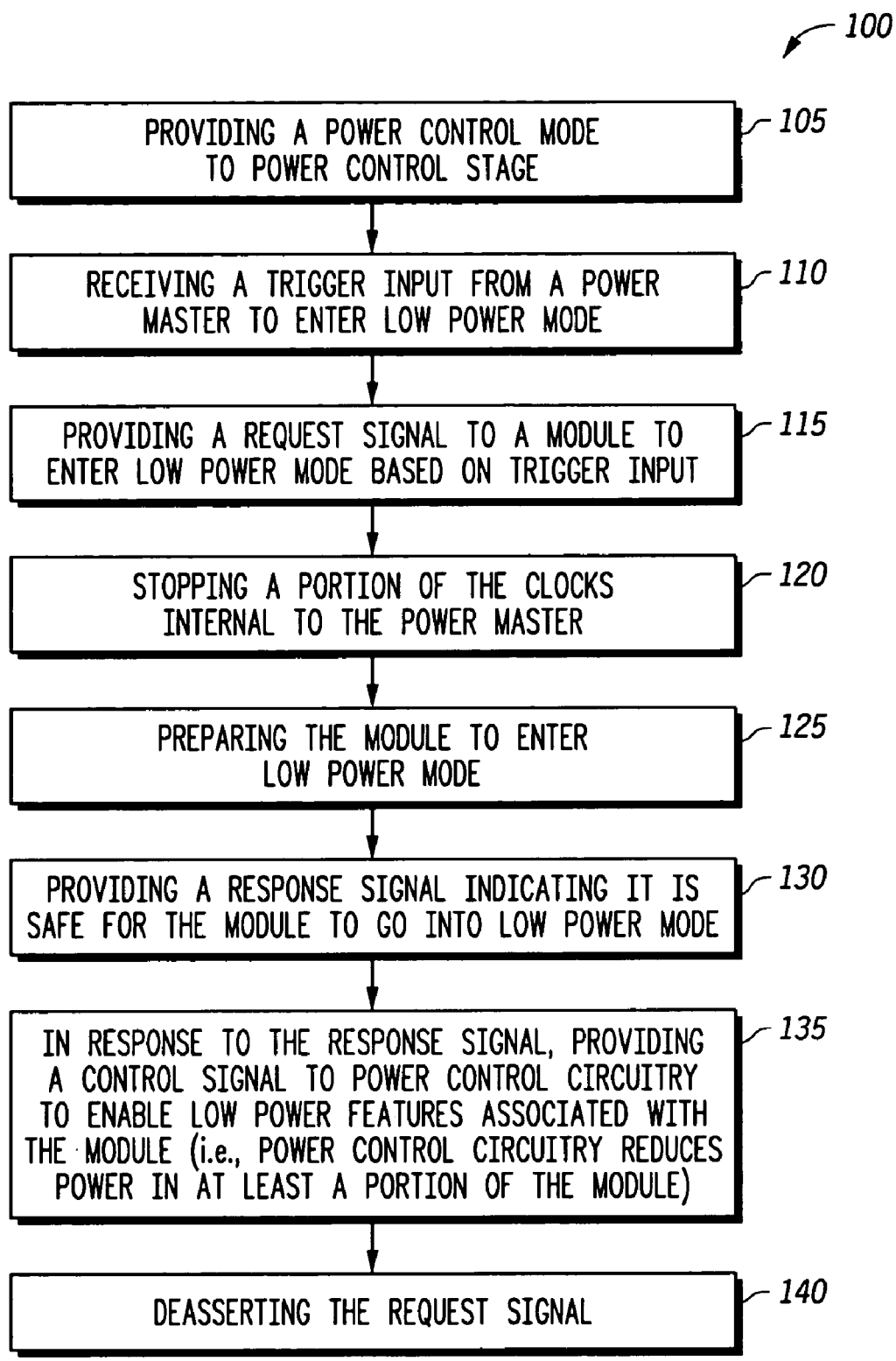
FIG. 4 illustrates, in flow diagram form, a method for entering low power mode in accordance with one embodiment of the present invention.

FIG. 4 illustrates, in flow diagram form, a method for entering low power mode in accordance with one embodiment of the present invention. Flow 100 starts at block 105 with the step of providing a power control mode to a power control stage. The flow then continues to block 110 with the step of receiving a trigger input from a power master to enter low power mode. The flow then continues to block 115 with the step of providing a request signal to a module to enter low power mode based on a trigger input. The flow then continues to block 120 with the step of stopping a portion of the clocks internal to the power master. The flow then continues to block 125 with the step of preparing the module to enter low power mode. The flow then continues to block 130 with the step of providing a response signal indicating it is safe for the module to go into low power mode. The flow then continues to block 135 with the step of, in response to the response signal, providing a control signal to power control circuitry to enable low power features associated with the module (i.e. power control circuitry reduces power in at least a portion of the module). The flow then continues to the final block 140 with the step of deasserting the request signal. Note that the flow illustrated in FIG. 4 is just one possible method for entering low power mode. Alternate embodiments of the present invention may use a wide variety of other methods for entering low power mode.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for entering a low power mode, comprising:
   providing a first power control mode indicator to a first power control stage, said first power control mode indicator selecting a first low power mode;
   receiving a trigger input signal at said first power control stage triggering at least a first module to enter said first low power mode;
   providing a first request signal requesting said first module to enter said first low power mode based on said trigger input signal;
   providing a first response signal indicating that said first module is ready to enter said first low power mode; and
   providing a first control signal in response to said first response signal, said first control signal enabling low power features corresponding to said first low power mode.

2. The method of claim 1, further comprising:
   deasserting said first request signal based on said first control signal.

3. The method claim of 1, wherein said first request signal is an interrupt holdoff signal.

4. The method of claim 1, wherein said low power features include at least one of clock gating, reducing voltage, power gating, well biasing, state retention power gating, and dynamic voltage/frequency scaling.

5. The method claim of 4, wherein said first module is a power master.

6. The method of claim 5, wherein said power master is at least one of a microcontroller, digital signal processor, microprocessor, and clock and reset module.

7. The method of claim 6, further comprising enabling at least a portion of said low power features that are internal to said power master based on said first request signal.

8. The method of claim 7, wherein the step of deasserting said first request signal is performed using a first feedback output signal and a first feedback input signal, wherein first feedback output signal is provided by said first power control stage.

9. The method of claim 8, further comprising providing a first trigger output signal to a second power control stage, providing said first feedback input signal using a second feedback output signal, and providing said second feedback output signal using said first trigger output signal.

10. The method of claim 9, wherein said second feedback output signal is provided using a second power control mode indicator corresponding to said second power control stage.

11. The method of claim 10, further comprising providing said second power control mode indicator to said second power control stage, said second power control mode indicator selecting a second low-power mode, receiving said first trigger output signal at said second power control stage triggering at least a second module to enter said second low power mode, providing a second request signal requesting said second module to enter said second low power mode based on said first trigger output signal, providing a second response signal indicating that said second module is ready to enter said second low power mode, providing a second control signal in response to said second response signal, said second control signal enabling said low power features corresponding to said second low power mode, and deasserting said second request signal based on said second control signal.

12. The method of claim 11, wherein said first power control mode indicator and said second power control mode indicator are tied to a node.

13. The method of claim 11 wherein said second module is one of a display controller, a graphics controller, a camera sensor interface, a video encoder, a video decoder, a direct memory access controller, USB, or any other type of accelerator.

14. The method of claim 11, wherein said first low power mode and said second low power mode are at least one of a WAIT mode, a STOP mode, a DOZE mode, and a Deep Sleep Mode (DSM).

15. An apparatus for entering a low power mode, comprising:
    a first module;
    a first power control stage coupled to said first module;
    a first power control mode indicator provided to said first power control stage, said first power control mode indicator selecting a first low power mode;
    a trigger input signal received at said first power control stage triggering at least said first module to enter said first low power mode;
    a first request signal requesting said first module to enter said first low power mode, said first request signal based on said trigger input signal;
    a first response signal indicating that said first module is ready to enter said first low power mode; and
    a first control signal provided in response to said first response signal, said first control signal enabling low power features corresponding to said first low power mode, wherein said first request signal is deasserted based on said first trigger input signal.

16. The apparatus of claim 15, wherein said first module is a power master being at least one of a microcontroller, digital signal processor, and microprocessor, said low power features include at least one of clock gating, reducing voltage, power gating, well biasing, state retention power gating, and dynamic voltage/frequency scaling, and said low power mode is at least one of a WAIT mode, a STOP mode, a DOZE mode, and a Deep Sleep Mode (DSM).

17. The apparatus of claim 16, wherein said deassertion is performed using a first feedback output signal and a first feedback input signal, wherein first feedback output signal is provided by said first power control stage.

18. The apparatus of claim 17, wherein said first power control stage provides a first trigger output signal to a second power control stage, and said first feedback input signal is generated using said first feedback output signal and a second feedback output signal corresponding to said second power control stage, wherein said second feedback output signal is generated using said first trigger output signal.

19. The method of claim 18, wherein said second feedback output is generated using a second power control mode indicator corresponding to said second power control stage.

20. An apparatus for entering a low power mode, comprising:
    a first power control stage, said first power control stage receiving a first input signal and generating a first request signal based on said first input signal; and
    a first module coupled to said first power control stage, wherein said first module receives said first request signal and provides a first response signal in response to receiving said first request signal, said first response signal indicating that said first module is ready to enter a first low power mode, said first low power mode being predicated by a mode indicator, said first power control stage providing a first control signal in response to said first response signal, said first request signal being deasserted based on said first control signal.

21. The apparatus of claim 20, wherein said first module is a power master, said first request signal is an interrupt holdoff, said first request signal being deasserted is based on a first feedback output signal and a feedback input signal, and said first feedback output signal is provided by said first power control stage.

* * * * *